Patented June 24, 1941

2,246,988

UNITED STATES PATENT OFFICE 2,246,988

CYCLOHEXYL UNSYMMETRICAL DIPHENYL ETHANES

Frank B. Smith and Harold W. Moll, Midland, Mich., assignors to The Dow Chemical Company, Midland, Mich., a corporation of Michigan No Drawing. Application January 16, 1939, Serial No. 251,126

5 Claims. (Cl. 260—668)

This invention concerns certain new chemical products prepared by reaction between unsymmetrical diphenyl ethane and cyclohexene or other cyclohexylating agent. The new products comprise mixtures of unsymmetrical diphenyl ethane derivatives wherein the unsymmetrical diphenyl ethane is substituted in one or both of the aryl nuclei by one or more cyclohexyl groups. They vary in physical characteristics from colorless liquids to resinous solids, depending upon the number of cyclohexyl groups in the molecule. They are particularly useful as plasticizing or addition agents for various synthetic plastic compositions and may also be employed as liquid dielectric agents and as intermediates in the preparation of other new chemical products.

The new cyclohexyl unsymmetrical diphenyl ethane products are preferably prepared by reacting cyclohexene with unsymmetrical diphenyl ethane in the presence of an alkylation catalyst, e. g. aluminum chloride, ferric chloride, boron trifluoride, aluminum bromide, activated bleaching earths, such as Retrol or Tonsil, etc. If desired, however, other cyclohexylating agents, such as cyclohexyl chloride, cyclohexyl bromide, cyclohexanol, etc., may be employed. The reactants may be employed in any desired proportions, although the products vary in properties with changes in such proportions. For example, unsymmetrical diphenyl ethane may be reacted with its molecular equivalent of cyclohexene or other cyclohexylating agent to produce a mixture comprising isomeric mono-cyclohexyl unsymmetrical diphenyl ethanes together with some dicyclohexyl and other poly-cyclohexyl unsymmetrical diphenyl ethanes. The yield of poly-cyclohexyl products may be raised by increasing the proportion of the cyclohexylating agent employed in the reaction or by cyclohexylating the mono-cyclohexyl compounds obtained from a previous reaction. Ordinarily, we prefer to employ approximately 1-4 moles of the cyclohexylating agent per mole of unsymmetrical diphenyl ethane. The optimum proportion of catalyst varies somewhat with the particular reactants employed and the conditions under which the reaction is carried out, but we usually employ between about 0.01 and 0.15 part by weight of catalyst per part of unsymmetrical diphenyl ethane.

The reaction is preferably carried out by heating a mixture of the reactants and catalyst under pressure in a closed vessel or autoclave, although it may, if desired, be carried out at atmospheric pressure by gradually adding the cyclohexylating agent to a heated and well-stirred mixture of unsymmetrical diphenyl ethane and catalyst, and thereafter continuing the heating and stirring until reaction is complete. When operating at atmospheric pressure, however, the reaction takes place slowly, particularly when a molecular excess of the cyclohexylating agent is used, and for this reason we prefer to carry out the reaction under increased pressure. The reaction temperature is usually between about 150° C. and about 250° C., although higher temperatures may sometimes be employed, especially when preparing the poly-cyclohexylated compounds. The reaction is usually complete in from 1 to 10 hours depending upon the proportion of reactants and the reaction conditions employed. Upon completion of the reaction, the mixture is treated to remove the catalyst, and any unreacted unsymmetrical diphenyl ethane and cyclohexylating agent is distilled off under vacuum. The cyclohexyl unsymmetrical diphenyl ethane product may be employed directly as a plasticizing agent, intermediate, etc., or it may be fractionally distilled to obtain fractions representing mixed isomeric mono-cyclohexyl unsymmetrical diphenyl ethanes, mixed isomeric di-cyclohexyl unsymmetrical diphenyl ethanes, etc.

The following example illustrates one way in which the principle of the invention has been applied, but is not to be construed as limiting the same.

*Example*

A mixture of 364 grams (2.0 moles) of unsymmetrical diphenyl ethane and 18 grams of Retrol was heated at 200° C. to drive off the residual water contained in the Retrol, after which 180.0 grams (2.2 moles) of cyclohexene was added gradually with stirring while maintaining the mixture at approximately 200° C. The reaction proceeded quite slowly, however, and after two hours heating the partially reacted mixture was cooled and charged into a pressure vessel together with an additional 364 grams of unsymmetrical diphenyl ethane, 210 grams of cyclohexene, and 82 grams of dried Retrol. The mixture was then heated at 200°–220° C. for one hour under the autogenic pressure of the reactants. Upon completion of the reaction, the mixture was cooled to 150° C. and filtered to remove the catalyst. The crude cyclohexyl unsymmetrical diphenyl ethane product was a dark golden yellow liquid displaying a green fluorescence. It was fractionally distilled under vacuum, whereby the following fractions were obtained:

Table

| Fraction No. | Appearance | Yield | Distillation range, °C. under 20 mm. pressure | Specific gravity 25/25° C. | Refractive index, $n_D^{25}$ | Product |
|---|---|---|---|---|---|---|
| | | *Grams* | | | | |
| 1 | Colorless mobile liquid. | 292 | Up to 155 | | | Unreacted materials. |
| 2 | Colorless liquid | 83 | 155–212 | 0.967 | 1.5440 | Mixed fraction. |
| 3 | do | 129 | 212–237 | 0.993 | 1.5578 | Isomeric mono-cyclohexyl unsymmetrical diphenyl ethanes. |
| 4 | Colorless viscous liquid. | 155 | 237–250 | 0.998 | 1.5623 | Mixed isomeric mono- and di-cyclo-hexyl unsymmetrical diphenyl ethanes. |
| 5 | Light yellow viscous liquid. | 139 | 250–300 | 1.000 | 1.5599 | Isomeric di-cyclohexyl unsymmetrical diphenyl ethanes. |
| 6 | Very viscous amber liquid. | 74 | 300–300 under 2 mm. | 1.006 at 60/60° C | 1.5691 | Mixed isomeric di- and tri-cyclo-hexyl unsymmetrical diphenyl ethanes. |
| Residue | Dark amber resin | 100 | Above 300 under 2 mm. | | | Mixed poly-cyclohexyl unsymmetrical diphenyl ethanes. |

In the following claims the term "cyclohexyl unsymmetrical diphenyl ethanes" is employed as a generic term to include unsymmetrical diphenyl ethanes in which either or both of the aryl nuclei bear at least one cyclohexyl substituent.

Other modes of applying the principle of our invention may be employed instead of those explained, change being made as regards the method herein disclosed or the materials employed provided the product stated by any of the following claims or the equivalents of such stated products may be obtained.

We therefore particularly point out and distinctly claim as our invention:

1. A nuclearly cyclohexylated unsymmetrical diphenyl ethane.

2. A mixture consisting substantially of nuclearly mono-cyclohexylated and nuclearly poly-cyclohexylated unsymmetrical diphenyl ethanes, said mixture being prepared by reacting unsymmetrical diphenyl ethane with a cyclo-unsymmetrical hexylating agent in the presence of an alkylation catalyst.

3. A mixture consisting substantially of isomeric nuclearly mono-cyclohexylated and nuclearly di-cyclohexylated unsymmetrical diphenyl ethanes, said mixture being a colorless viscous liquid distilling at temperatures between about 237° C. and about 250° C. under 20 millimeters pressure, and having a specific gravity of approximately 0.998 at 25/25° C.

4. A mixture consisting substantially of isomeric nuclearly di-cyclohexylated unsymmetrical diphenyl ethanes, said mixture being a light yellow viscous liquid distilling at temperatures between about 250° C. and about 300° C. under 20 millimeters pressure, and having a specific gravity of approximately 1.000 at 25/25° C.

5. A mixture consisting substantially of isomeric nuclearly di-cyclohexylated and nuclearly tri-cyclohexylated unsymmetrical diphenyl ethanes, said liquid mixture being a viscous amber liquid distilling at temperature between about 300° C. under 20 millimeters pressure and about 300° C. under 2 millimeters pressure, and having a specific gravity of approximately 1.006 at 60/60° C.

FRANK B. SMITH.
HAROLD W. MOLL.